United States Patent
Breuer

(10) Patent No.: US 10,823,839 B2
(45) Date of Patent: *Nov. 3, 2020

(54) APPARATUS WITH A SENSOR ASSEMBLY AND A STRAY LIGHT BAFFLE

(71) Applicant: Conti Temic microelectronic GmbH, Nuremberg (DE)

(72) Inventor: Karsten Breuer, Oberreute (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,920

(22) Filed: Oct. 29, 2019

(65) Prior Publication Data

US 2020/0064463 A1 Feb. 27, 2020

Related U.S. Application Data

(63) Continuation of application No. 16/359,466, filed on Mar. 20, 2019, now Pat. No. 10,620,308.

(30) Foreign Application Priority Data

Mar. 22, 2018 (DE) .................. 10 2018 204 438

(51) Int. Cl.
*G01S 13/86* (2006.01)
*B60R 11/04* (2006.01)
(Continued)

(52) U.S. Cl.
CPC .............. *G01S 13/867* (2013.01); *B60R 1/00* (2013.01); *B60R 11/04* (2013.01); *G01S 13/931* (2013.01);
(Continued)

(58) Field of Classification Search
CPC ....... G01S 13/867; G01S 13/931; B60R 1/00; B60R 11/04
See application file for complete search history.

(56) References Cited

U.S. PATENT DOCUMENTS

| 2002/0024713 A1 | 2/2002 | Roberts et al. |
| 2003/0222809 A1 | 12/2003 | Nakazawa et al. |

(Continued)

FOREIGN PATENT DOCUMENTS

| DE | 102009060392 | 6/2011 |
| DE | 102015210464 | 12/2016 |

(Continued)

OTHER PUBLICATIONS

German Examiner Wolfgang Hofmann, German Office Action in German Patent Application No. 10 2018 204 438.4, dated Nov. 9, 2018, 9 pages, with English translation, 9 pages.

(Continued)

*Primary Examiner* — Marc Anthony Armand
(74) *Attorney, Agent, or Firm* — W. F. Fasse

(57) ABSTRACT

An apparatus includes a sensor assembly and a stray light baffle, and is to be mounted behind a pane, e.g. a windshield, inside a vehicle. The sensor assembly includes a first sensor and a second sensor. The stray light baffle is arranged substantially in front of the first sensor, in the capture direction of the sensors. The stray light baffle includes first and second side walls. The second side wall is a frame with a fabric covering, and is arranged in front of the second sensor with the sensing axis of the second sensor passing through the fabric.

21 Claims, 1 Drawing Sheet

(51) Int. Cl.
*G01S 13/931* (2020.01)
*G03B 11/04* (2006.01)
*B60R 1/00* (2006.01)
*B60R 11/00* (2006.01)
*G01S 7/02* (2006.01)

(52) U.S. Cl.
CPC ....... *G03B 11/04* (2013.01); *B60R 2011/0026* (2013.01); *B60R 2300/108* (2013.01); *B60R 2300/301* (2013.01); *G01S 2007/027* (2013.01); *G01S 2013/93276* (2020.01)

(56) References Cited

U.S. PATENT DOCUMENTS

| | | |
|---|---|---|
| 2009/0295181 A1 | 12/2009 | Lawlor et al. |
| 2011/0163904 A1 | 7/2011 | Alland et al. |
| 2014/0029103 A1 | 1/2014 | Budleski |
| 2014/0160284 A1 | 6/2014 | Achenbach et al. |
| 2014/0358418 A1* | 12/2014 | Nakajima ............. B60W 30/09 701/301 |
| 2015/0234045 A1* | 8/2015 | Rosenblum ............. G06T 7/215 342/71 |
| 2016/0356594 A1* | 12/2016 | Sorenson ................ G01S 17/10 |
| 2017/0274837 A1* | 9/2017 | Kasai ...................... B60R 11/04 |
| 2017/0284017 A1 | 10/2017 | Petra et al. |

FOREIGN PATENT DOCUMENTS

| | | |
|---|---|---|
| JP | 2003315450 A | 11/2003 |
| JP | 2012505115 A | 3/2012 |
| JP | 2016070927 A | 5/2016 |
| JP | 2017531099 A | 10/2017 |
| WO | WO 2006/035510 | 4/2006 |

OTHER PUBLICATIONS

Grant Decision in German Patent Application No. 10 2018 204 438.4, dated Jan. 21, 2019, 11 pages, with partial English translation, 3 pages.
Euro NCAP Rating Review 2018, Report from the Ratings Group, Nov. 2018, http://www.euroncap.com/, Nov. 2018, version 1.1, pp. 1 to 15.
For Safer Cars, Euro NCAP—the roadmap to 2020, published by Euro NCAP, PACTS Parliamentary Advisory Council for Transport Safety, 2016, pp. 1 to 15.

* cited by examiner

APPARATUS WITH A SENSOR ASSEMBLY AND A STRAY LIGHT BAFFLE

CROSS-REFERENCE TO RELATED APPLICATION

This application is a Continuation under 35 USC 120 of U.S. patent application Ser. No. 16/359,466 filed Mar. 20, 2019 and issued as U.S. Pat. No. 10,620,308 on Apr. 14, 2020. All disclosures of the prior application are incorporated herein by reference.

FIELD OF THE INVENTION

The invention relates to an apparatus with a sensor assembly and a stray light baffle.

BACKGROUND INFORMATION

Systems in which, for example, a radar sensor is arranged outside of, i.e., next to, above or below, the stray light baffle needed for the camera are known from the prior art. Further, in sensors which are combined in this way stray light baffles are known which have been increased in width so that the radar antenna can also be positioned directly next to the camera without being influenced by interfering surfaces (e.g., zigzag profile or edges) of the stray light baffle.

Further, DE102015210464A1 discloses a housing for a radar sensor and an optical sensor, wherein one housing wall has a layer which attenuates radar waves and one housing wall has layer which reflects radar waves.

SUMMARY OF THE INVENTION

It is an object of the present invention to provide an apparatus which has a sensor assembly and a stray light baffle, which has a compact construction and reduces interfering influences on the utilized sensors.

This object can be achieved by the subject matter of the invention set forth herein.

Initial considerations were to the effect that a large installation space is required in the previously known solutions, particularly when wide-angle cameras (>100° field of view, FoV) are used as is required, e.g., for high performance in the car safety assessment according to the Euro NCAP 2018/2020 (European New Car Assessment Program). For example, the size of a stray light baffle for a combined sensor consisting of a 90° radar and a 110° camera with a joint enlarged stray light baffle would be up to 50 cm. For reasons pertaining to obscured view and design, large apparatuses of this kind are generally not acceptable for the front windshield. Therefore, according to the invention, an apparatus is suggested which comprises a sensor assembly and a stray light baffle, wherein the apparatus is mountable inside of a vehicle on a pane, in particular a windshield, wherein the sensor assembly has a first sensor and a second sensor, wherein the stray light baffle is arranged substantially in front of the first sensor in the capture direction of the sensors at the sensor assembly, wherein the stray light baffle has a first side wall and a second side wall, wherein the first side wall is made of a plastics material and the second side wall is a frame with a fabric covering, and wherein the second side wall is arranged in front of the second sensor.

"Arranged substantially in front of the first sensor" means that the stray light baffle is arranged in front of the first sensor is such that the first side wall and the second side wall extend to the left and to the right, respectively, of the first sensor. Alternatively, it would also be possible to configure both side walls as frame with a fabric covering.

Particularly preferably, the first sensor is an optical sensor, in particular a camera. It is furthermore preferable that the second sensor is a radar sensor.

The stray light baffle is required only for the optical sensor and, therefore, needs to have an opening only for this sensor. The second sensor which is preferably a radar sensor can be located behind a side wall of the stray light baffle. However, in order to prevent interference with the second sensor, the second side wall is configured as a frame with a fabric covering because, for example, only a negligibly small attenuation of radar waves, if any, occurs as a result of the fabric. A configuration of this kind is particularly advantageous because, in this way, the installation space need not be enlarged compared to an individual optical sensor with stray light baffle, and both sensors are nevertheless functional.

In a further particularly preferred embodiment, the radar sensor and the optical sensor are arranged next to one another in the horizontal direction. An arrangement of this kind is advantageous with respect to the design of the stray light baffle and with respect to the mounting on a windshield, since a vertical arrangement of the sensors would extend too far into the vision field of a driver on the one hand and, on the other hand, would negatively influence the shape of the stray light baffle, which would make the mounting on a windshield more difficult.

It is furthermore preferable that the fabric of the fabric covering is a velvet. It is known from older designs of stray light baffles for cameras that velvet as surface, in place of specially shaped plastics profiles, also meets optical requirements. In addition, velvet has no significant attenuation for radar radiation. Accordingly, the second side wall, which is covered with the fabric or velvet, can also be arranged in front of a radar sensor without influencing its functioning.

BRIEF DESCRIPTION OF THE DRAWINGS

Further advantageous configurations follow from the accompanying drawings. The drawings show.

DETAILED DESCRIPTION OF EXAMPLE EMBODIMENTS OF THE INVENTION

Figure 1:
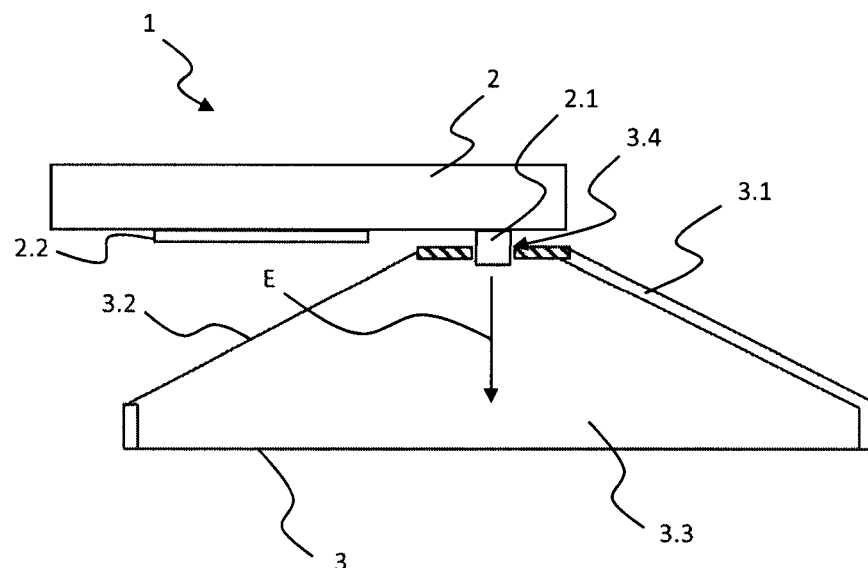
FIG. 1 a top view of an embodiment of the invention.

FIG. 1 shows a top view of an embodiment of the invention. This depiction shows an apparatus 1 with a sensor assembly 2. The sensor assembly 2 has a camera 2.1 as a first sensor and a radar sensor 2.2 as a second sensor. These two sensors 2.1, 2.2 are arranged next to one another in the horizontal direction. Further, a stray light baffle 3 is arranged in front of the camera 2.1 in the capture direction (E), e.g. as defined by a sensing axis E of the camera 2.1. The stray light baffle 3 has an opening 3.4 for the camera 2.1. The stray light baffle further comprises a first side wall 3.1 and a second side wall 3.2 and an upper side 3.3 and a lower side (not shown here). The first side wall 3.1 can be produced from a plastics material.

Figure 2:
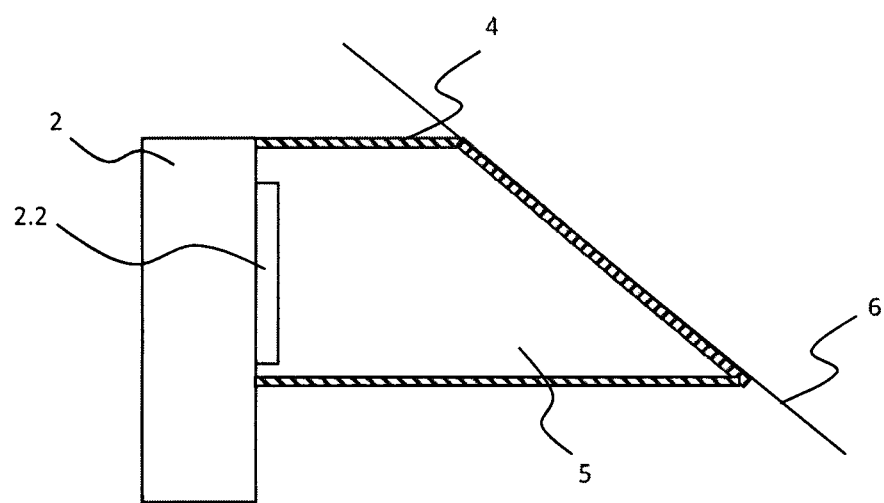
FIG. 2 a side view of an embodiment of the invention.

FIG. 2 shows a side view of an embodiment of the invention. In this case, the sensor assembly 2 is shown with a radar sensor 2.2. The camera 2.1 is not visible in this view. The second side wall 3.2 of the stray light baffle 3 is also shown, wherein, in this embodiment, the second side wall 3.2 is a frame 4 with a fabric covering 5. As is shown, the stray light baffle 3 is shaped such that it is mountable on a windshield 6 of a vehicle (not shown here).

As can be seen in FIGS. 1 and 2 understood in connection with the above description, both sensors 2.1 and 2.2 have their respective sensing axes or capture directions E facing forward through the windshield 6. The sensing axis or capture direction E of the first sensor (camera sensor) 2.1 extends from the first sensor forwardly through the opening 3.4, thence through a space between the two side walls 3.1 and 3.2 of the stray light baffle 3, and thence through a front aperture of the stray light baffle 3 bounded between the two side walls. The sensing axis or capture direction (not illustrated) of the second sensor (radar sensor) 2.2 extends from the second sensor forwardly through only the fabric covering 5 and not the frame 4 of the second side wall 3.2, thence through the space between the two side walls, and thence through the front aperture of the stray light baffle 3. The frame 4 forms only a periphery of the second side wall 3.2, the fabric covering 5 spans the frame 4 to cover a central area bounded by the frame 4 around the periphery of the second side wall 3.2, and the central area of the second side wall 3.2 consists of only the fabric covering 5.

LIST OF REFERENCE NUMERALS 1 apparatus
2 sensor assembly
2.1 first sensor
2.2 second sensor
3 stray light baffle
3.1 first side wall
3.2 second side wall
3.3 upper side
3.4 opening
4 frame
5 fabric covering
6 windshield
E capture direction

What is claimed is:

1. An apparatus comprising a sensor assembly and a stray light baffle, wherein:
the apparatus is configured and adapted to be mounted inside of a vehicle on a pane;
the sensor assembly includes a first sensor and a second sensor;
the stray light baffle is arranged substantially in front of the first sensor in a capture direction of the sensors;
the stray light baffle includes a first side wall and a second side wall;
the second side wall comprises a perimeter frame and a fabric that spans and is peripherally supported by the perimeter frame;
the second side wall is arranged in front of the second sensor with a sensing axis of the second sensor passing through the fabric of the second side wall; and
the sensing axis of the second sensor extends from the second sensor forwardly through only the fabric and not the perimeter frame of the second side wall, thence through a space between the first and second side walls, and thence through a front aperture of the stray light baffle bounded between the first and second side walls.

2. The apparatus according to claim 1, wherein the first side wall comprises another perimeter frame and another fabric that spans and is peripherally supported by the another perimeter frame.

3. The apparatus according to claim 1, wherein the first sensor is an optical sensor.

4. The apparatus according to claim 3, wherein the second sensor is a radar sensor.

5. The apparatus according to claim 4, wherein the radar sensor and the optical sensor are arranged next to one another in a horizontal direction.

6. The apparatus according to claim 1, wherein the fabric of the second side wall is a velvet fabric.

7. The apparatus according to claim 1, wherein the pane is a windshield of the vehicle.

8. The apparatus according to claim 1, wherein the second sensor is a radar sensor.

9. The apparatus according to claim 1, configured so that the sensing axis of the second sensor and a sensing axis of the first sensor are both oriented facing forward through the pane when the apparatus is mounted inside of the vehicle on the pane.

10. A sensor apparatus configured and adapted to be mounted behind a windshield inside a vehicle, said sensor apparatus comprising:
an optical sensor configured with a sensing axis thereof to be oriented through the windshield when the sensor apparatus is mounted inside the vehicle;
a radar sensor arranged next to the optical sensor, and configured with a sensing axis thereof to be oriented through the windshield when the sensor apparatus is mounted inside the vehicle; and
a stray light baffle comprising first and second side walls that extend forwardly from the optical sensor and diverge obliquely from one another on opposite sides of the sensing axis of the optical sensor, to a front aperture of the stray light baffle defined between the first and second side walls;
wherein the second side wall comprises a perimeter frame and a fabric that spans and is peripherally supported by the perimeter frame,
wherein the radar sensor is arranged with the sensing axis thereof extending through the fabric of the second side wall and through the front aperture of the stray light baffle, and
wherein the sensor apparatus comprises at least one feature selected from the group consisting of:
a first feature wherein the sensing axis of the radar sensor extends from the radar sensor forwardly through only the fabric and not the perimeter frame of the second side wall, thence through a space between the first and second side walls, and thence through the front aperture of the stray light baffle,
a second feature wherein the perimeter frame forms only a periphery of the second side wall, the fabric spans the perimeter frame to cover a central area bounded by the perimeter frame around the periphery of the second side wall, and the central area of the second side wall consists of only the fabric, and
a third feature wherein only the fabric of the second side wall is arranged in front of and intersecting the sensing axis of the radar sensor.

11. The sensor apparatus according to claim 10, wherein the first side wall comprises another perimeter frame and another fabric that spans and is peripherally supported by the another perimeter frame.

12. The sensor apparatus according to claim 10, wherein the optical sensor is an optical sensor of a wide angle camera.

13. The sensor apparatus according to claim 12, wherein the wide angle camera has a field of view greater than 100°.

14. The sensor apparatus according to claim 10, wherein the fabric of the second side wall is a flat sheet of velvet.

15. The sensor apparatus according to claim 10, wherein the radar sensor is arranged entirely behind the second side wall of the stray light baffle with respect to a forward direction defined along the sensing axis from the optical sensor to the front aperture of the stray light baffle.

16. The sensor apparatus according to claim 10, comprising the first feature.

17. The sensor apparatus according to claim 10, comprising the second feature.

18. The sensor apparatus according to claim 10, comprising the third feature.

19. An apparatus comprising a sensor assembly and a stray light baffle, wherein:
   the apparatus is configured and adapted to be mounted inside of a vehicle on a pane;
   the sensor assembly includes a first sensor and a second sensor;
   the stray light baffle is arranged substantially in front of the first sensor in a capture direction of the sensors;
   the stray light baffle includes a first side wall and a second side wall;
   the second side wall comprises a perimeter frame and a fabric that spans and is peripherally supported by the perimeter frame;
   the second side wall is arranged in front of the second sensor with a sensing axis of the second sensor passing through the fabric of the second side wall; and
   the apparatus comprises at least one feature selected from the group consisting of:
      a first feature wherein the perimeter frame forms only a periphery of the second side wall, the fabric spans the perimeter frame to cover a central area bounded by the perimeter frame around the periphery of the second side wall, and the central area of the second side wall consists of only the fabric, and
      a second feature wherein only the fabric of the second side wall is arranged in front of and intersecting the sensing axis of the second sensor.

20. The apparatus according to claim 19, comprising the first feature.

21. The apparatus according to claim 19, comprising the second feature.

* * * * *